March 1, 1960     T. G. GRANRYD     2,926,799
COUNTERWEIGHT ARRANGEMENT FOR TRACTOR LOADER
Filed Nov. 19, 1956     3 Sheets-Sheet 1
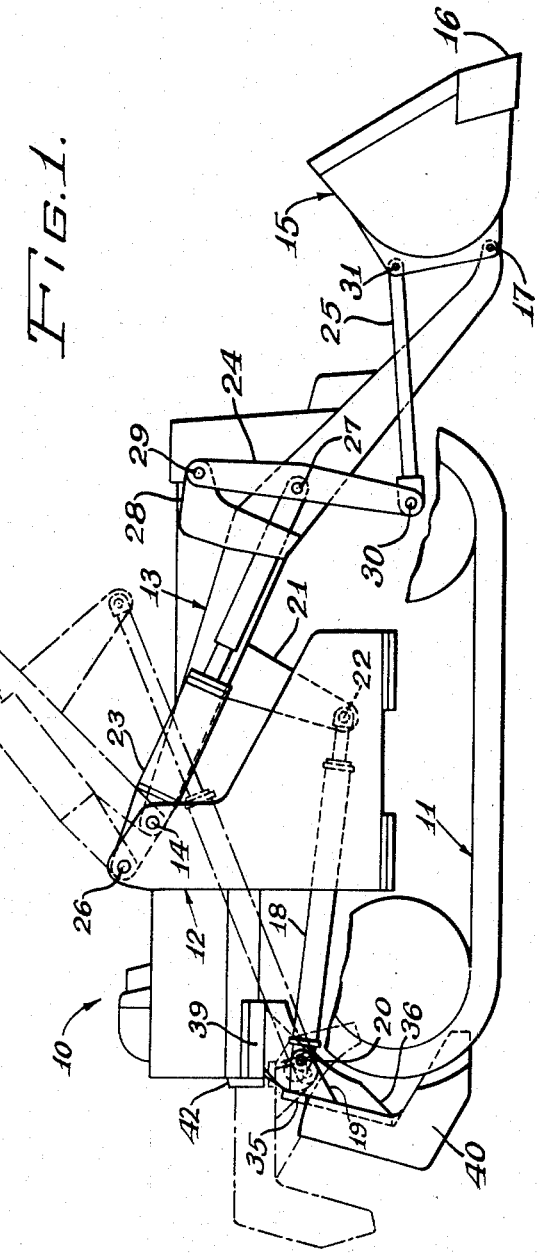
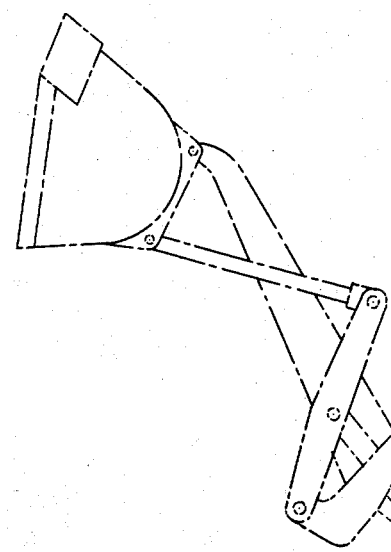
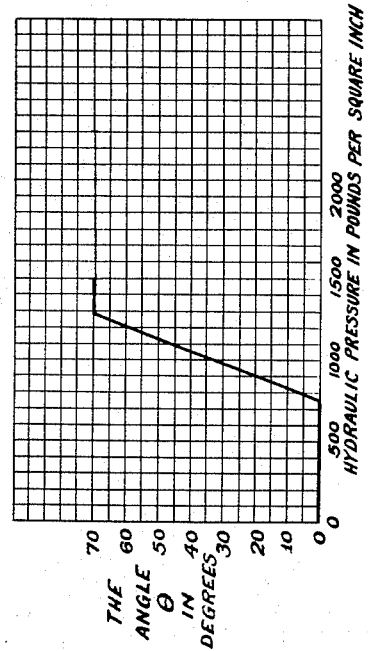
Inventor:
Thorvald G. Granryd

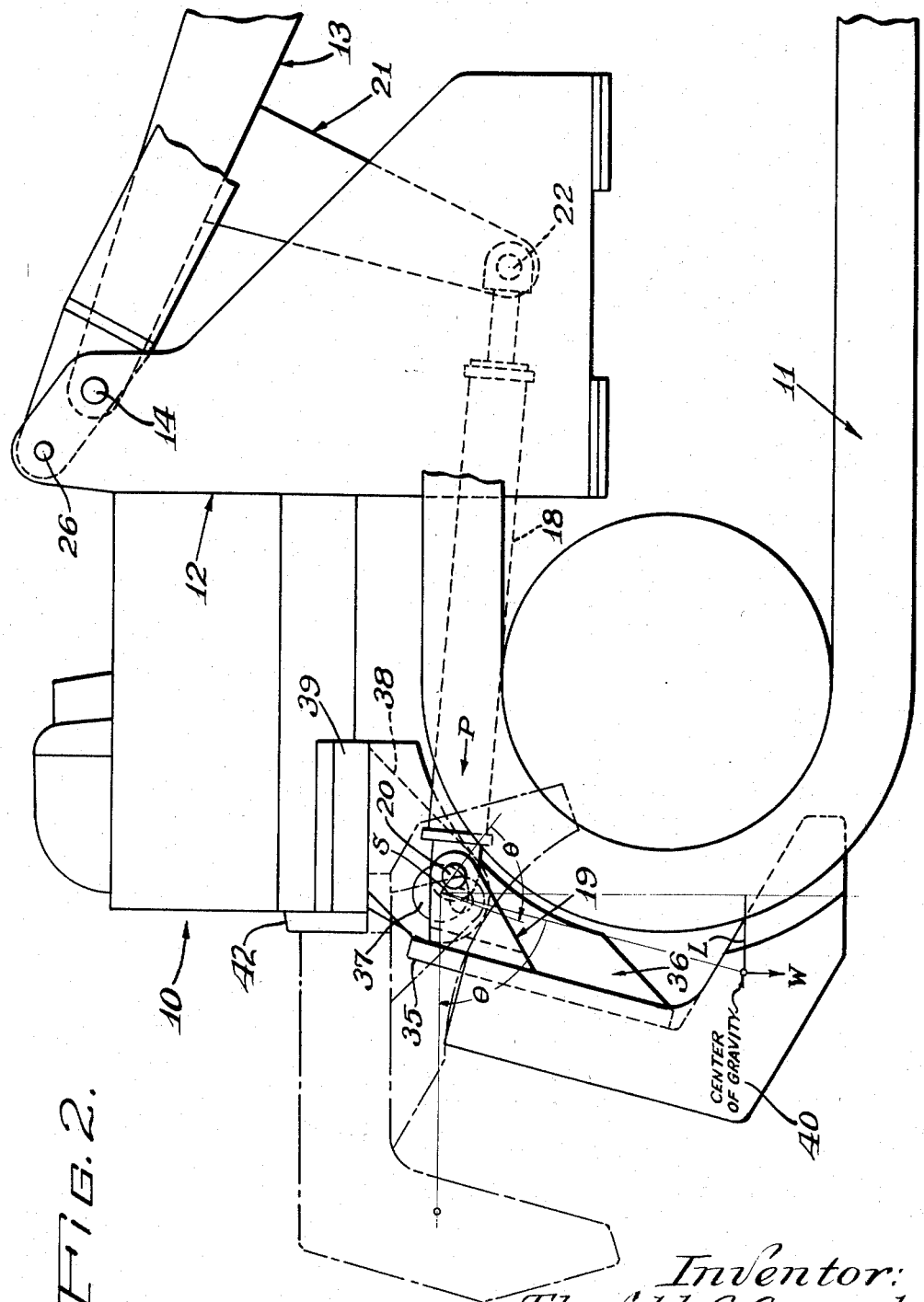

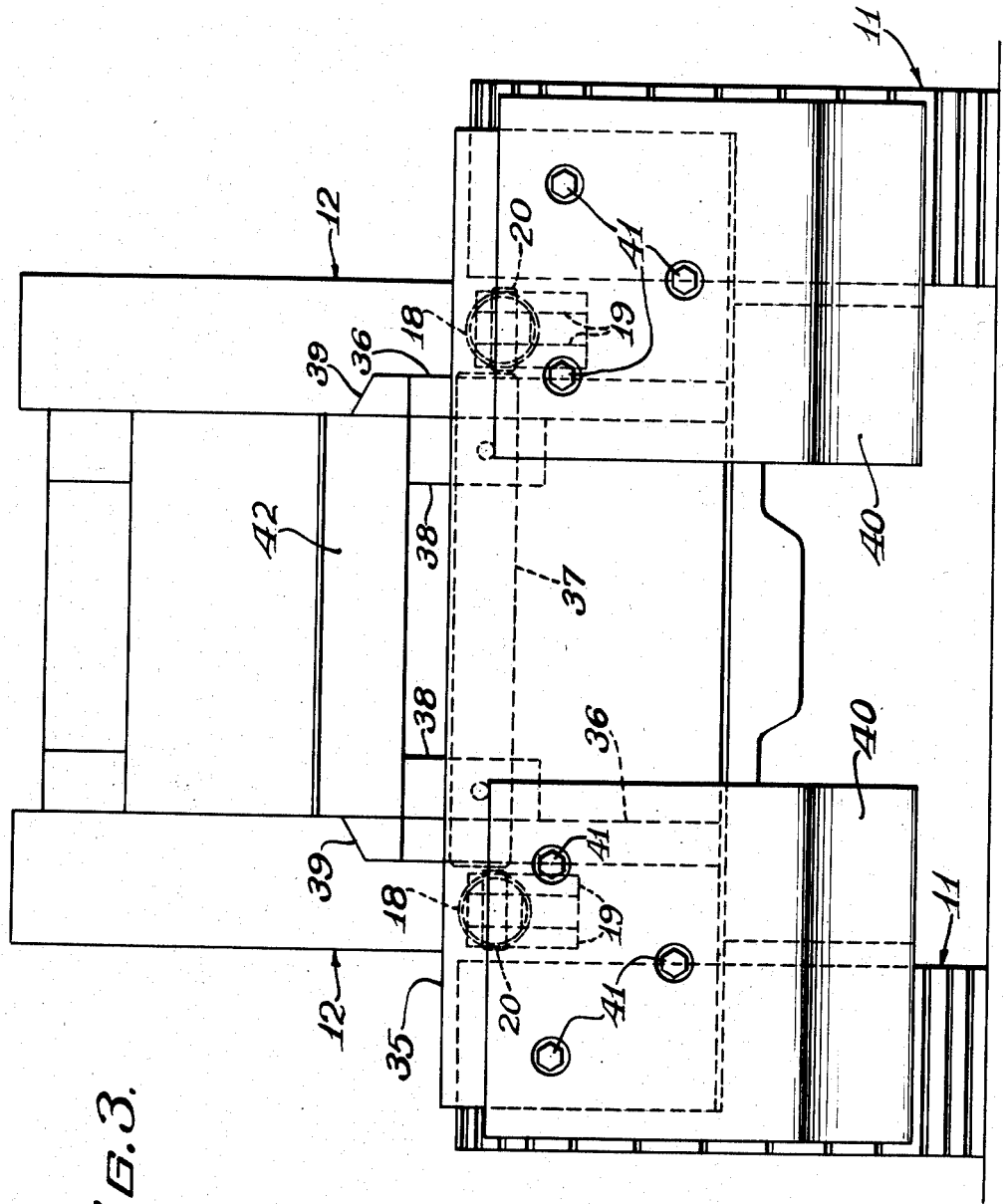

United States Patent Office 2,926,799
Patented Mar. 1, 1960

2,926,799

COUNTERWEIGHT ARRANGEMENT FOR TRACTOR LOADER

Thorvald G. Granryd, Libertyville, Ill., assignor to The Frank G. Hough Co., a corporation of Illinois Application November 19, 1956, Serial No. 623,095

12 Claims. (Cl. 214—142)

This invention relates generally to tractor loaders, and more specifically to an improved counterweight arrangement for a front end type tractor loader wherein the counterweight arrangement is load sensitive.

Front end type loaders as known in the art generally comprise a tractor or prime mover and an earth-working tool carried by the tractor and extending forwardly thereof. The earth-working tool commonly used comprises a boom carrying a bucket which is caused to dig into some material filling the bucket, which is then moved to a carrying position for transporting of the loaded bucket to some remote location, and which is then pivoted to dump the load therefrom. Since the bucket generally extends a substantial distance forwardly of the point of ground contact of the forward portion of the traction means of the tractor, the loads imposed upon the bucket in digging and carrying tend to raise the rearward end of the tractor using the point of ground engagement of the forward portion of the traction means as a fulcrum. This tendency would not affect the operation of the loader if the weight of the tractor rearwardly of that fulcrum were substantially greater than any load which could be imposed upon the bucket. However, in an effort to produce a loader with the greatest economy in manufacture for any one size of earth-working tool or bucket, the art generally provides the smallest possible tractor. One feature which has helped to keep the tractor relatively small has been the addition of a counter-weight to the rearward end of the tractor. This solution has not been entirely satisfactory since if the counterweight is made large enough to compensate for the heaviest loads which may be imposed upon the bucket, a relatively expensive arrangement results since in the most used middle range of loads imposed upon the bucket, the counterweight is larger than required. It is an object of this invention to provide a counterweight arrangement for a front end type tractor loader wherein with a counterweight of minimum weight, maximum weight compensation is provided for the loads imposed upon the bucket.

It is another object of the present invention to provide a counterweight arrangement for a front end type tractor loader wherein the compensating force produced by the counterweight on the tractor varies within a range ideally suited to the normal operations of these loaders.

It is a further object of the present invention to provide a counterweight arrangement for a front end type tractor loader wherein the compensating force produced by the counterweight upon the tractor varies in a certain unique manner with the load imposed upon the bucket.

It is a further object of the present invention to provide a counterweight arrangement for a front end type tractor loader which is simple in construction, efficient in operation, and economical relative to the mass of the counterweight.

A feature of the present invention is the mounting of a counterweight for a front end type tractor loader in cooperation a portion of the hydraulic means for operating the bucket.

Other objects and features of the present invention will be apparent upon a perusal of the following specification and drawings of which:

Figure 1 is a side elevational view of a tractor loader constructed according to the present invention;

Figure 2 is an enlarged showing of a portion of the tractor loader shown in Figure 1;

Figure 3 is a rear elevational view of the structure shown in Figure 2; and

Figure 4 is a graph showing some of the operating characteristics of the present invention.

The present embodiment is the preferred embodiment but it is to be understood that changes can be made in the present embodiment by one skilled in the art without departing from the spirit and scope of the present invention.

Generally the present invention comprises a certain counterweight construction movably mounted on the rearward end of the body of a tractor loader comprising a tractor and a bucket operatively carried from the forward end of the tractor, with hydraulic means for operating the bucket and with a certain construction causing a cooperation between the counterweight and the hydraulic means.

For a detailed description of the invention reference is made to the drawings. The tractor 10 of the present embodiment is of the crawler track type having an operator's compartment disposed at the rear thereof, and an engine compartment disposed forwardly thereof. The traction means for the tractor comprises conventional crawler tracks 11 operatively mounted to track frames (not shown). The track frames support the body of the tractor.

The earth-working tool means comprises a tool supporting frame 12 formed in two portions carried on each side of the body of the tractor on the track frames of the traction means. A boom 13 formed in duplicate portions disposed on each side of the tractor 10 is pivotally mounted at the rear end thereof to the tool support 12 through pivotal mounting means 14. The other end of the boom 13 extends forwardly of the tractor 10. A conventional bucket 15 having a cutting edge 16 is pivotally mounted to the forward ends of the boom 13 through pivotal mounting means 17. To raise and lower the boom 13 and the bucket 15 carried thereby, a pair of hydraulic rams 18 are provided. The hydraulic rams 18 are disposed one on each side of the tractor 10 and the head end of each is pivotally mounted betweeen a pair of flanges 19 by means of pins 20. The mounting of the flanges 19 will be described below. The rod ends of the hydraulic rams 18 are each mounted to a bracket 21 through pivotal mountings 22. The brackets 21 are secured to each portion of the boom 13 intermediate the ends thereof.

To control pivoting of the bucket 15 relative to the boom 13, a linkage arrangement is provided. This linkage arrangement is formed in two identical portions on each side of the tractor 10 and only one need be described in detail. One portion of the linkage arrangement comprises a hydraulic ram 23, a lever 24, and a link 25. The hydraulic ram 23 is pivotally mounted at the head end thereof to the tool support 12 through pivotal mountings 26. The rod end of the hydraulic ram 23 is pivotally mounted to the lever 24 intermediate the ends thereof through pivotal mounting means 27. The piston rod of the hydraulic ram 23 includes an extension which projects between bracket 28 and the boom 13. The bracket 28 is secured to the boom 13 and pivotally supports one end of the lever 24 through pivotal mounting means 29. The other end of the lever 24 is pivotally mounted to one end of the link 25 through pivotal mounting means 30. The other end of the link 25 is pivotally mounted to the rear side of the bucket 15 through pivotal mounting means 31. When the bucket 15 is in the digging position at ground level, the lever 24 depends substantially vertically and the link 25 is substantially horizontal. If the hydraulic ram 23 is contracted from a position such as shown in Figure 1, the bucket 15 will be pivoted rearwardly to the breakout position. In this breakout position of the bucket 15, the pivotal mounting means 26, 14, 31 and 17 will define a parallelogram so that if the boom 13 is raised about pivotal mounting means 26 through an extension of the hydraulic rams 18, the bucket will remain in the pivoted position relative to ground level to which it had been pivoted by the contraction of the hydraulic ram 23.

In describing the operation of the earth-working tool let it be assumed that the flanges 19 are secured to the body of the tractor 10. With the hydraulic rams 18 and 23 operated to an extent such that the bucket 15 is in the digging position at ground level as shown in Figure 1, the tractor 10 may then be moved forwardly to cause the cutting edge 16 of the bucket 15 to dig into some material being worked. In this digging function, which may occur at levels other than ground level by an appropriate extension of the hydraulic rams 18, the hydraulic rams 18 and especially 23 may be operated to cause the bucket 15 to move in a scooping action tending to fill the bucket with the maximum amount of loaded material. When the bucket is fully loaded, the hydraulic rams 23 may be contracted to tip the bucket rearwardly whereby the maximum load is effectively retained within the confines of the bucket 15. The tractor 10 may then be moved to some remote location such as a bin or hauling vehicle for dumping of the load. The hydraulic rams 18 may then be extended to cause the bucket 15 to be raised to any height up to the position shown in the dotted lines in Figure 1. By an extension of the hydraulic rams 23, the bucket will then be caused to pivot forwardly to dump the load therefrom, and the empty bucket may then be returned to any selected digging position for further working of the material by suitable operations of the hydraulic rams 18 and 23. From the foregoing it may be seen that the functions which exert the greatest forces or loads upon the bucket 15 and in turn the tractor 10 are the digging and carrying functions. For any one sized tractor loader, and the materials normally worked by a loader of that size, it has been found that the range of load magnitudes varies from relatively small loads to substantially great loads with the greatest number of loads falling in an intermediate range of average loads. These loads may be defined as substantially downward forces upon the bucket 15, and are felt by the loader as increased hydraulic fluid pressure in the hydraulic rams 18 and a moment acting upwardly on the pivotal mounting means 26 about the forward end of the traction means. It has been found desirable that a counterweight have little action in the lower range of load magnitudes, effective action in the middle range of load magnitudes, and a limited amount of action in the upper range of load magnitudes. Little counterweight action is needed in the lower range of load magnitudes since the weight of the tractor itself is more than sufficient to compensate for these forces. Most effective action is desired in the middle range since the greatest number of loads occur in this middle range and the greatest counterweight efficiencies result when the weight of the tractor alone is too small to easily counteract these loads. Little counterweight action is needed in the upper range since in this range, the hydraulic fluid pressures developed in the hydraulic rams 18 reach pressures approaching the upper limits for which the hydraulic system is designed. These desirable counterweight characteristics will be further discussed below.

The flanges 19 which had been assumed above as secured to the body of the tractor 10 are actually mounted on a large rectangular plate 35 and disposed in a spaced apart relationship longitudinally thereof as can be seen in Figure 3. A pair of brackets 36 are also provided for the plate 35. The pair of brackets 36 are secured to the plate 35 transversely thereof between the flanges 19 and in a spaced apart relationship to each other longitudinally of the plate 35. Each of the brackets 36 are provided with a hole therethrough along a common axis. The brackets 36 are journalled on the opposite ends of a shaft 37. The shaft 37 is secured within a pair of blocks 38, and the blocks 38 are mounted in a spaced apart relationship to each other transversely of and depending from the rear portion of the body of the tractor 10. This mounting of the shaft 37 causes the brackets to depend from each side of the tractor 10 at the rear end thereof and the plate 35 is then disposed transversely of the tractor 10. The flanges 19 extend forwardly of the plate 35 as can be seen in Figures 1 and 2. A pair of stops 39 are also provided, and are mounted on each side of the tractor 10 at the rear end thereof. The stops 39 cooperate with one longitudinal edge of the brackets 36 to limit the pivotal movement of the brackets 36 on the shaft 37 in a counterclockwise direction as viewed in Figure 2. A pair of counterweights 40 are also provided. Counterweights 40 which have a substantial width and are somewhat L-shaped when viewed in side elevation, are fastened to the plate 35 in a spaced apart relationship to each other longitudinally thereof by a plurality of fasteners 41. When so mounted, the entire counterweight assembly has a center of gravity approximately as indicated in Figure 2. With this center of gravity there is a tendency of the counterweight assembly to pivot about shaft 37 in a counterclockwise direction as viewed in Figure 2. With the bracket 36 abutting the stops 39, the center of gravity of the counterweight assembly is rearwardly of a vertical plane through the pivot axis of the brackets 36. The lower leg of each of the counterweights is formed to have an indented portion for avoiding the crawler tracks 11 when the counterweight assembly is in its position of maximum counterclockwise rotation as viewed in Figure 2. To limit the clockwise rotation of the counterweight assembly at a particular point, a block 42 is provided. The block 42 is mounted on the rear side of the body of the tractor 10 and cooperates with the counterweights 40 so that the upper leg of the counterweights 40 abuts the block 42 when the counterweight assembly has been rotated clockwise as viewed in Figure 1 to a position wherein the upper leg is substantially horizontal. The center of gravity of the counterweight assembly is then below a horizontal plane through the pivot axis of the brackets 36. The brackets 36 are so shaped relative to the stops 39 that the center of gravity of the counterweight assembly is approximately 20 degrees clockwise of a vertical line through the center of the shaft 37. The center of gravity of the counterweight is movable through an arc of approximately 70 degrees. The flanges 19 are so shaped that the center of the pivotal mounting means or pins 20 are disposed at an angle of approximately 50 degrees counterclockwise of a vertical line through the center of the shaft 37 when the brackets 36 abut the stops 39, so that the center of the pins 20 is disposed at an angle of approximately 20 degrees clockwise of a vertical line through the center of the shaft 37 when the counterweights 40 are pivoted to engage the block 42, and so that the centers of the pins 20 trace an arc substantially adjacent to the circumference of the shaft 37 when the counterweight assembly is so pivoted about shaft 37. Thus it may be seen that relative to the center of the shaft 37, both the center of the pins 20 and the center of gravity of the counterweight assembly are movable from the maximum counterclockwise position as shown in Figure 2, through an angle $\theta$ which in the present embodiment has a range of approximately 70 degrees.

The force applied by the hydraulic rams 18 against the force produced by the counterweight assembly may be equated to the hydraulic fluid pressure in the cylinders of the rams 18 multiplied by the internal area of the head ends of the cylinders. Defining this force as P, we find;

$$P = A \cdot p$$

Where A is the internal area of the head ends of the cylinders in square inches, and $p$ is the hydraulic fluid pressure in the cylinder in pounds per square inch. The effective moment arm through which this force acts extends from the center of the shaft 37 to the line through the center of the pin 20 and the pivotal mounting means 22, and at a right angle thereto. This effective moment arm in inches has been designated with the letter S. It may be seen that this moment arm S increases in length as the angle $\theta$ changes from zero to about 50 degress and decreases as the angle $\theta$ goes from about 50 degrees to 70 degrees. The force produced by the counterweight assembly tending to rotate the counterweight assembly about the shaft 37 against the force produced by the hydraulic rams 18, may be defined as the weight of the counterweight assembly in pounds which may be designated with the letter W acting through the moment arm in inches which has been designated with the letter L and extends from the center of gravity horizontally to the vertical line through the center of the shaft 37. It may be seen that this moment arm L increases at a decreasing rate as the counterweight assembly is pivoted from angle $\theta$ at zero degrees to an angle $\theta$ of 70 degrees. These forces of the hydraulic rams 18, and the counterweight may then be equated as follows:

$$P \cdot S = W \cdot L$$

Substituting for P in this equation from the first equation and solving for $p$ we find:

$$p = \frac{W}{A} \cdot \frac{L}{S}$$

It can thus be seen that the pressure in p.s.i. is equal to the weight of the counterweight assembly divided by the area of the cylinders of the hydraulic rams 18 and multiplied by the ratio of the length of the moment arm for the counterweight to the length of the moment arm for the hydraulic ram. Referring particularly to Figure 4, it should be noted that in tractor loaders of the subject type, the hydraulic pressures generally encountered range from zero p.s.i. to somewhere above 1500 p.s.i. Referring to the previously discussed various ranges of loads, the low range, intermediate range, and high range had been noted for these tractor loaders, and it may further be noted that the hydraulic pressures in p.s.i. in each hydraulic ram 18 for the middle range generally vary from about 750 p.s.i. to about 1300 p.s.i. with the low range coinciding with hydraulic pressures below 750 p.s.i. and with the high range coinciding with hydraulic fluid pressures above 1300 p.s.i. Considering then that the counterweight assembly has a given weight and taking a pair of hydraulic cylinders of a given diameter, the pivot axis of the pin 20 is so positioned, relative to the center of gravity and pivot axis of the counterweight assembly, that the ratio of L to S solved for actual values and plotted as shown in Figure 4 produces a straight line from approximately 750 p.s.i. and an angle $\theta$ of zero to approximately 1300 p.s.i. at an angle $\theta$ of 70 degrees. This straight line insures that the weight compensation of the counterweight assembly will be uniform for the different loads upon the bucket 15 which cause the hydraulic fluid pressures in the hydraulic rams 18 to be varied between approximately 750 and 1300 p.s.i. With the arrangement of the present invention as described and the proportions shown, a graph such as shown in Figure 4 results. For loaders of the described type, a total counterweight of about 3000 pounds and hydraulic cylinder diameters of 5 inches would be entirely practical.

The resulting operation of the instant invention may then be described in three phases, the first phase, that wherein the hydraulic pressures in the cylinders are below 750 p.s.i., the second phase, wherein the hydraulic pressures of the cylinders vary from 750 to 1300 p.s.i., and the third phase, wherein the hydraulic fluid pressures in the cylinders are above 1300 p.s.i. When the tractor loader is operating and relatively light loads are imposed upon the bucket 15, such that the hydraulic fluid pressure in each hydraulic ram 18 is below 750 p.s.i., the counterweight assembly will not be pivoted upwardly. This provides stability of the loader for the light loads of the first phase. As loads upon the bucket 15 are increased such that the pressure in each hydraulic ram 18 rises above 750 p.s.i., the counterweight assembly will begin to be moved in a clockwise direction as viewed in Figures 1 and 2. This action will continue until the hydraulic pressure in each cylinder reaches approximately 1300 p.s.i. This provides for the most efficient counterweight action in the second phase. When the hydraulic pressure in each hydraulic ram 18 rises above approximately 1300 p.s.i., the counterweight assembly will reach its position of maximum clockwise rotation as viewed in Figures 1 and 2 and thereabove, the effective counterweight action will not be increased. This provides that in the third phase, wherein the hydraulic system is approaching its maximum permissible pressures or overloaded condition no additional counterweight effort is provided, and thus the counterweight assembly is not constructed any larger than needed for effective and efficient operation of the loader.

Having described the invention what is considered new and desired to be protected by Letters Patent is:

1. In a tractor implement, a boom mounted on one side of said tractor implement for raising and lowering with respect thereto, a counterweight pivotally mounted on the tractor implement on the side opposite from said boom, an extensible link having one end connected to said boom to raise said boom upon extension thereof, and the other end of said extensible link being connected to said counterweight at a position spaced from its pivotal mounting to permit outward swinging of said counterweight about its pivotal mounting in response to certain loads imposed on said boom.

2. In a tractor implement as claimed in claim 1, wherein said extensible link comprises a hydraulic ram.

3. In a tractor loader, a boom pivotally mounted on one side of said tractor, a counterweight pivotally mounted on said tractor on the side thereof opposite from said boom, a bracket carried on said boom intermediate the ends thereof and depending therefrom below the pivotal axes of said boom and said counterweight on said tractor, a hydraulic ram, means pivotally connecting one end of said hydraulic ram to the lower end of said bracket, means pivotally connecting the other end of said hydraulic ram to said counterweight at a position spaced downwardly from the pivotal axis of said counterweight on said tractor, whereby certain loads upon said boom applied through said bracket and said hydraulic ram will cause an upward swinging of said counterweight about its pivotal axis on said tractor.

4. In combination, a tractor having traction means supporting the body of said tractor, a boom pivotally mounted on said body of said tractor to extend forwardly thereof, a bucket operatively mounted on the forward end of said boom, a counterweight pivotally mounted at the rearward end of said body of said tractor to depend therefrom, a hydraulic ram for raising and lowering said boom, one end of said hydraulic ram pivotally mounted to said boom intermediate the ends thereof, the other end of said hydraulic ram pivotally mounted to said counterweight at a position so that said hydraulic ram causes said counterweight to be pivoted to increase the force produced by said counterweight on said body of said tractor in opposition to the forces produced on said body of said tractor when the weight of increasing loads are imposed upon said bucket.

5. In a combination as claimed in claim 4, wherein said counterweight and said hydraulic ram are formed and positioned so that said counterweight produces a certain minimum constant force for weights of loads upon said bucket smaller than a certain minimum, so that the force produced by said counterweight increases at a corresponding rate for increasing weights of loads on said bucket above said certain minimum and below a certain maximum, and so that said counterweight produces a certain constant maximum force for weights of loads on said bucket above said certain maximum value.

6. In a tractor loader having a tractor comprising a tractor body supported by traction means, an earth-working tool mounted on said body to extend forwardly thereof and operating under various loads to tend to pivot the rearward end of said tractor body upwardly about the forward end of said traction means, a counterweight pivotally mounted on a horizontal transverse axis on the rear end of said body so that the moment of said counterweight about the forward end of said tractor is varied when said counterweight is pivoted, a stop mounted on said body for limiting the downward and forward pivoting of said counterweight to a point wherein the center of gravity thereof is rearwardly of a vertical line through the pivot axis of said counterweight, a second stop mounted on said body for limiting the upward and rearward pivoting of said counterweight to a point wherein the center of gravity of said counterweight is below a horizontal line through the axis of pivoting of said counterweight, a hydraulic ram for operating said earth-working tool, and means inter-connecting said hydraulic ram and said counterweight so that said counterweight is pivoted by said hydraulic ram between said limits to vary said moment directly with said various loads upon said earth-working tool.

7. In a tractor loader having a tractor comprising a tractor body supported by traction means, an earth-working tool mounted on said body to extend forwardly thereof and operating under various loads to tend to pivot the rearward end of said tractor body upwardly about the forward end of said traction means, a shaft mounted transversely of and on the rearward end of said body, a bracket journalled on each end of said shaft, a plate secured to said brackets transversely of said body, counterweights mounted on said plate to depend therefrom, a stop mounted on said body and cooperable with said brackets to limit the downward and forward movement of the center of gravity of said counterweights at a point rearwardly of a vertical plane through the longitudinal axis of said shaft, and a second stop mounted on said body at the rear end thereof and cooperable with said counterweights to limit the arc through which said counterweights are pivotable rearwardly and upwardly at a point below a horizontal plane through the longitudinal axis of said shaft whereby the moment of said counterweights about the forward end of said traction means is varied between said limits when said counterweights are pivoted, a hydraulic ram for operating said earth working tool, and means interconnecting said hydraulic ram and said plate so that said counterweights are pivoted by said hydraulic ram between said limits to vary said moment directly with said various loads upon said earth-working tool.

8. In a tractor loader as claimed in claim 7 wherein said counterweights are formed to be substantially L-shaped with one leg thereof secured to said plate along a line generally radial to the longitudinal axis of said shaft and so that the other leg thereof extends forwardly thereof.

9. In a tractor loader having a tractor comprising a tractor body supported by traction means, an earth-working tool mounted on said body to extend forwardly thereof and operating under the weights of various loads to tend to pivot the rearward end of said tractor body upwardly about the forward end of said traction means, a shaft mounted transversely of and on the rearward end of said body, a bracket journalled on each end of said shaft, a plate secured to said brackets transversely of said body, counterweights mounted on said plate to depend therefrom whereby the moment of said counterweights about the forward end of said traction means is varied when said counterweights are pivoted, a hydraulic ram for operating said earth-working tool, a pair of flanges secured to said plate, a pin pivotally mounting one end of said hydraulic ram to said pair of flanges so that said plate and said counterweights are pivoted by said hydraulic ram by the weights of certain loads upon said earth working tool, said pair of flanges being formed to position said pin relative to said shaft so that the moment of said counterweights about the forward end of said traction means varies linearly with said weights of certain loads upon said earth-working tool.

10. In a tractor loader having a tractor body supported by traction means, an earth-working tool mounted on said body to extend forwardly thereof and operating under certain loads to tend to pivot the rearward end of said tractor body upwardly about the forward end of said traction means, a shaft mounted transversely of and on the rearward end of said body, a bracket journalled on each end of said shaft, a plate secured to said brackets transversely of said body, counterweights mounted on said plate to depend therefrom, a stop mounted on said body and cooperable with said brackets to limit the downward and forward movement of the center of gravity of said counterweights at a point rearwardly of a vertical plane through the longitudinal axis of said shaft, and a second stop mounted on said body at the rear end thereof and cooperable with said counterweights to limit the arc through which said counterweights are pivotable rearwardly and upwardly at a point below a horizontal plane through the longitudinal axis of said shaft whereby the moment of said counterweights about the forward end of said traction means is varied between said limits when said counterweights are pivoted, a pair of flanges mounted on said plate, a hydraulic ram, a pin pivotally mounting one end of said hydraulic ram to said pair of flanges, means connecting the other end of said hydraulic ram to said earth-working tool for operating said earth-working tool whereby said plate and said counterweights are pivoted between said limits by said hydraulic ram when said certain loads are imposed upon said earth-working tool.

11. In a tractor loader as claimed in claim 10 wherein said pin is positioned relative to the pivot axis of said brackets so that said moment of said counterweights about the forward end of said traction means is directly varied with the variations of said certain loads.

12. In a tractor loader as claimed in claim 11 wherein the center of gravity of said counterweights is positioned relative to the pivot axis of said brackets and said pin so that for certain minimum hydraulic pressures in said hydraulic ram said brackets and said counterweights cooperate with said first stop to produce a certain minimum constant moment about the forward end of said traction means and so that for certain maximum hydraulic pressures in said hydraulic ram said counterweights cooperate with said second stop to produce a certain constant maximum moment about the forward end of said traction means.

References Cited in the file of this patent

UNITED STATES PATENTS

| | | |
|---|---|---|
| 2,036,386 | Andersen | Apr. 7, 1936 |
| 2,130,487 | Foley | Sept. 20, 1938 |
| 2,449,279 | Conklin | Sept. 14, 1948 |
| 2,526,613 | Tanguy | Oct. 17, 1950 |
| 2,763,385 | Harrison | Sept. 18, 1956 |

FOREIGN PATENTS

| | | |
|---|---|---|
| 809,350 | Germany | July 30, 1951 |